R. C. GOSSETT.
ADJUSTABLE SEAT.
APPLICATION FILED APR. 25, 1917.

1,246,261.

Patented Nov. 13, 1917.

R. C. Gossett,
Inventor

UNITED STATES PATENT OFFICE.

RICHARD C. GOSSETT, OF MOSCOW, IDAHO.

ADJUSTABLE SEAT.

1,246,261.     Specification of Letters Patent.     Patented Nov. 13, 1917.

Application filed April 25, 1917. Serial No. 164,492.

*To all whom it may concern:*

Be it known that I, RICHARD C. GOSSETT, a citizen of the United States, residing at Moscow, in the county of Latah and State of Idaho, have invented a new and useful Adjustable Seat, of which the following is a specification.

The present invention relates to a seat for use in connection with agricultural machines, and especially with machines of this type that are used on the sides of hills.

The object of the invention is to provide a seat which may be easily adjusted at the will of the rider so as to be maintained in a horizontal position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1:
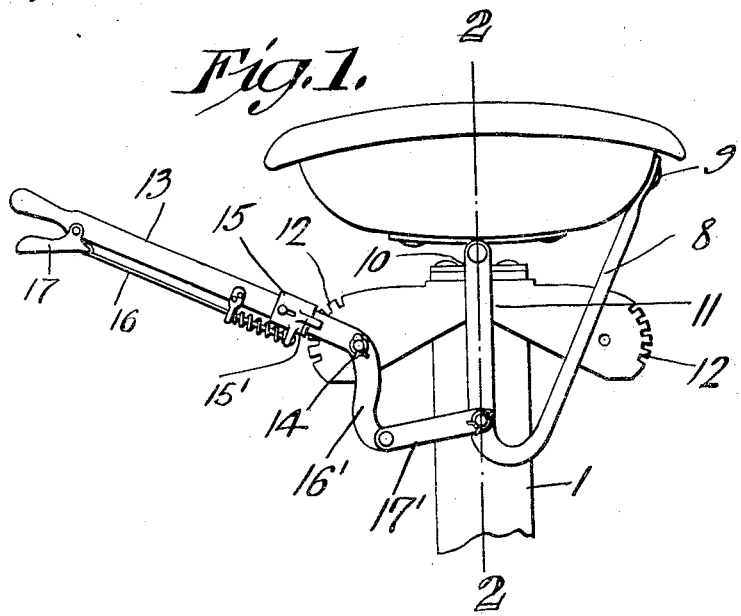
Figure 1 is a back view of the seat and the support therefor.
Figure 2:
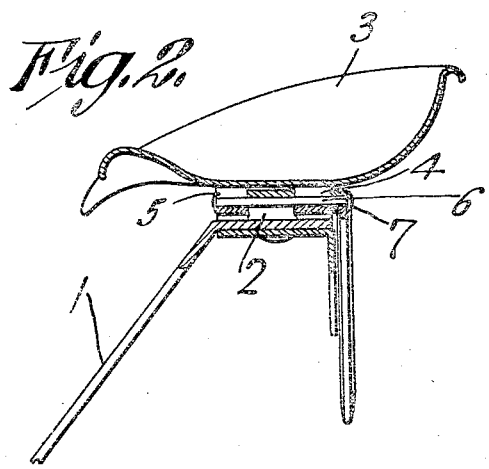
Fig. 2 is a section on line 2—2 of Fig. 1.

Referring more specifically to the drawings, 1 indicates a suitable support for a seat having its base attached to a vehicle, not shown, and its upper end provided with a sleeve 2. The numeral 3 indicates a seat which is provided on its under side with a pair of spaced sleeves 4 and 5, which aline with the sleeve 2 and form a continuous passage 6, through which a bolt 7 is passed, forming a hinged connection between the support 1 and the seat 3. A bracket 8, has one end 9, rigidly connected to seat 3, and another end 10 engaging the bolt 7.

The support 1, has rigidly connected on its upper end, and extending downwardly therefrom, a winged extension 11, the ends of which form rack segments 12. A lever 13, is fulcrumed on the extension 11 at 14, and is provided with a sliding sleeve 15 having oppositely extending teeth 15' one of which extends toward and is adapted to engage the adjacent segment 12. A spring controlled rod 16 and hand lever 17 are provided for shifting sleeve 15. The lever 13 is also provided with an extension 16', the latter being connected to bracket 8 by means of a link 17'. It is obvious that lever 13 may be fulcrumed on either side of extension 12 in order to be convenient to either the right or left hand.

Thus it will be seen that by manipulating the lever 13, link 17' will shift bracket 8 which in turn will oscillate seat 3 and allow the rider to ride in a level position.

Having described my invention, what I desire to secure by Letters Patent, is:—

The combination with a support, a seat tiltable laterally on the support and a depending member thereon, of opposed segments fixed to the support, a lever, means for pivotally connecting the lever to either segment, a link connection between the lever and depending member, and means on the lever and coöperating with either segment, for locking the seat against tilting on its support.

In testimony that I claim the foregoing as my own, I have hereto affixed my signature in the presence of two witnesses.

RICHARD C. GOSSETT.

Witnesses:
    H. MELGARD,
    C. A. TENWICK.

Copies of this patent may be obtained for five cents each, by addressing the "Commissioner of Patents, Washington, D. C."